Aug. 17, 1926.  
E. NISHINA  
1,596,213  
METHOD OF DRYING AND SOLIDIFYING ARTICLES OF FOOD  
Filed Dec. 1, 1921
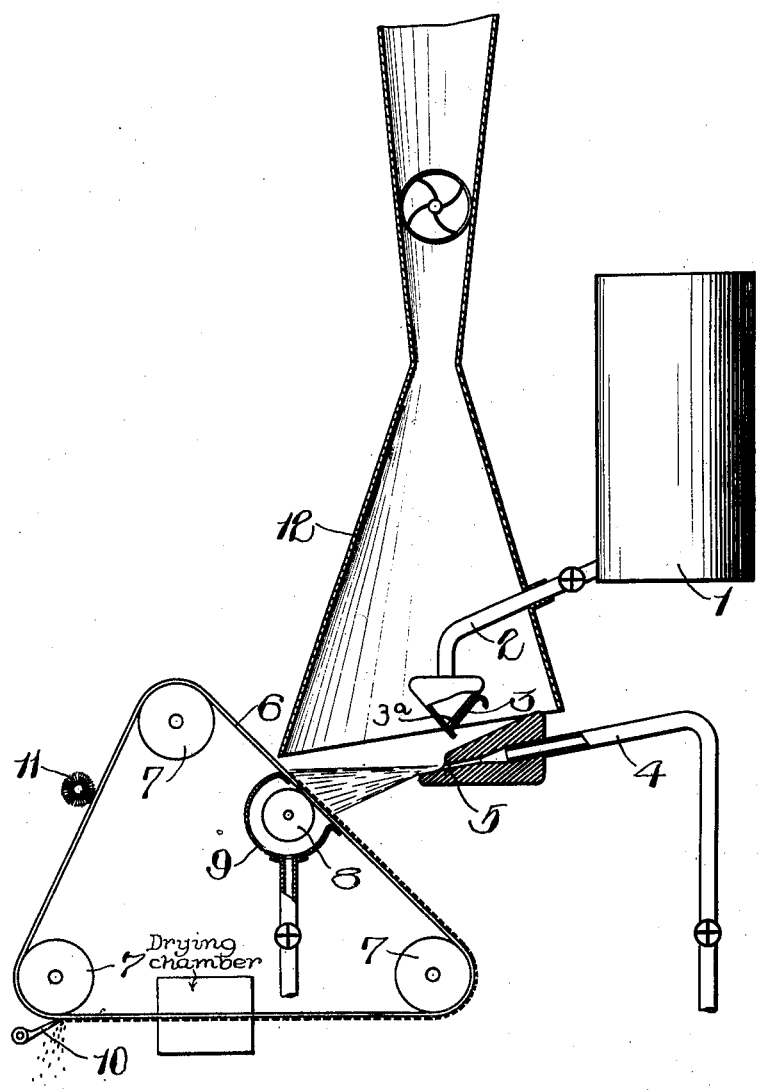
Inventor  
E. Nishina  
by Marks & Clerk  
Attys.

Patented Aug. 17, 1926.

1,596,213

UNITED STATES PATENT OFFICE.

ENPEI NISHINA, OF TOKYO-FU, JAPAN, ASSIGNOR OF ONE-HALF TO KAZO YAMA-GUCHI, OF KITA-KU, OSAKA, JAPAN.

METHOD OF DRYING AND SOLIDIFYING ARTICLES OF FOOD.

Application filed December 1, 1921, Serial No. 519,209, and in Japan September 3, 1921.

The present invention relates to a method of drying and concentrating semi-solidified foodstuff, and the like, into sheets or lumps, by projecting the substance out of spouts under a high pressure upon the surface of a travelling belt of felt or the like fabric, and dehydrating it; the object of this invention being to obtain foods in dry solid forms by rapidly dehydrating it without causing any change in their constitution.

The accompanying drawings illustrate the invention diagrammatically.

Referring to the drawing in detail wherein an apparatus for putting the invention into practice is illustrated, the numeral 1 indicates a tank connected by means of a lead pipe 2 with a long narrow discharge opening 3ª adapted to be regulated by an adjusting valve 3. A projecting nozzle 5 is arranged directly below the discharge opening, the nozzle being connected with a supply pipe 4 through which air at a pressure of 2000 to 5000 lbs. per square inch is conducted. The pasty material to be dried and solidified is deposited in the nozzle 5 from the discharge opening 3ª and is projected against an endless band of felt or like absorbent material 6 traveling over rollers 7 and 8 at a point directly over the roller 8. A suitable suction apparatus 12 is arranged over the nozzle 5 and is adapted to draw moisture, air or the like, upwardly therein. The shaft 8 is housed in a suction chamber 9 adapted to assist in drawing the moisture through the fabric. The endless belt and the layer of the material projected thereon is slowly moved through a drying chamber (not shown) and the layer is finally scraped off of the belt by a scraper 10 and the belt is cleaned by a brush 11.

To describe the manner of carrying this invention into practice with an example, small jets of foodstuff or the like, are projected by some suitable means out of spouts under a high pressure upon the surface of a slowly travelling endless belt of felt, cotton fabric, or the like, of the nature to absorb moisture; the pressure of the projection causes the water contained in the substance to be drained away and causes the substance to adhere to the belt, forming thereby a continuous film; the remaining water being further evaporated away, the belt with the film formed upon it is transferred into a drying chamber of reduced pressure and is perfectly dried there and the dry foodstuff thus formed is scraped off from the belt with a spatula.

Besides the above described applications, the present invention may also be applied to the treatment of vegetables, meat, fish, etc. With substances which are liable to change their constitution, being acted upon by the oxygen in the atmosphere, or when prompt evaporation is desired, the treatment should be carried out in the atmosphere of an inert gas, such as carbonic acid gas, or in vacuum. Dilute liquids had better be treated after it has been first evaporated and concentrated. With volatile or aromatic alcoholic substances, it is well first to distil them, thus extracting the volatile essential part out, and then to treat the residue only by the present method, to be mixed together in suitable proportions when to use them.

The process of reducing milk or the like into powder by atomizing the same in a drying chamber of reduced pressure and thus accelerating evaporation, is known long before the present invention; but the idea of the known method is only to increase evaporation surface, and is quite different from the present invention in which foodstuff is solidified at the same time expediting the work of solidifying by causing the water contained therein to drain off.

Claims.

1. A method of drying and concentrating articles of food consisting in projecting a substance to be dried against a porous surface under sufficient pressure to cause the solid portions of the substance to adhere to the surface and the liquid portions of the substance to be driven off by the force of the projection.

2. A method of drying and concentrating articles of food consisting in projecting a substance to be dried against a porous surface under sufficient pressure to cause the solid portions of the substance to adhere to the surface and the liquid portions of the substance to be driven off by the force of the projection into the surface, and subsequently subjecting the remaining solid portions of the substance to a drying treatment.

3. A method of drying and concentrating articles of food consisting in projecting a substance to be dried against a porous surface under sufficient pressure to cause the solid portions of the substance to be deposited on the surface and the liquid portions of the substance to be carried through the surface and subsequently subjecting the solid portions of the substance to a drying treatment in the atmosphere of an inert gas.

In testimony whereof I have affixed my signature.

ENPEI NISHINA.